US012718393B2

(12) United States Patent
Haven et al.

(10) Patent No.: US 12,718,393 B2
(45) Date of Patent: Aug. 25, 2026

(54) METHOD AND SYSTEM FOR CREATING A HIGH-FIDELITY DEPICTION OF A SCENE CONTAINING AN OBJECT

(71) Applicant: Liberty Robotics Inc., Dexter, MI (US)

(72) Inventors: G. Neil Haven, Clearwater, ID (US); Fansheng Meng, Ann Arbor, MI (US)

(73) Assignee: LIBERTY ROBOTICS INC., Dexter, MI (US)

( * ) Notice: Subject to any disclaimer, the term of this patent is extended or adjusted under 35 U.S.C. 154(b) by 232 days.

(21) Appl. No.: 18/639,402

(22) Filed: Apr. 18, 2024

(65) Prior Publication Data

US 2024/0303849 A1 Sep. 12, 2024

Related U.S. Application Data

(63) Continuation-in-part of application No. 17/491,975, filed on Oct. 1, 2021, now Pat. No. 12,118,778.

(51) Int. Cl.
*G06T 7/60* (2017.01)
*G06T 5/60* (2024.01)
(Continued)

(52) U.S. Cl.
CPC .................. *G06T 7/60* (2013.01); *G06T 5/60* (2024.01); *G06T 5/70* (2024.01); *G06T 7/521* (2017.01);
(Continued)

(58) Field of Classification Search
CPC .... G06T 5/60; G06T 5/70; G06T 7/60; G06T 7/521; G06T 7/593; G06T 7/75;
(Continued)

(56) References Cited

U.S. PATENT DOCUMENTS 5,878,152 A * 3/1999 Sussman ............ G01B 11/2513 382/141
7,227,977 B1 6/2007 Dotsenko
(Continued)

FOREIGN PATENT DOCUMENTS

CN 116245741 B * 11/2023 ............... G06T 5/73
JP 2015059849 A 3/2015

OTHER PUBLICATIONS

Notice of Allowance for U.S. Appl. No. 18/085,100, dated Apr. 23, 2025, 37 pages.
(Continued)

*Primary Examiner* — Carol W Chan
(74) *Attorney, Agent, or Firm* — Brooks Kushman P.C.

(57) ABSTRACT

A method and system for creating a high-fidelity depiction of a scene including an object within the scene are provided. The method includes uniformly illuminating a target surface of the object with light to obtain reflected, backscattered illumination. The method also includes sensing via a volumetric sensor, brightness of the surface due to a diffuse component of the backscattered illumination to obtain brightness information. Backscattered illumination from the target surface is inspected to obtain geometric measurements which include sensor noise. Rotationally and positionally invariant measured surface albedo including albedo noise of the object is computed based on the brightness and the geometric measurements. A machine-learning model such as a diffusion sensor model is applied to the geometric measurements and the measured surface albedo to remove the sensor noise and the albedo noise, respectively, to obtain a prediction of actual geometry and actual albedo, respectively, of the object.

11 Claims, 5 Drawing Sheets

(51) Int. Cl.
*G06T 5/70* (2024.01)
*G06T 7/521* (2017.01)
*G06T 7/593* (2017.01)
*G06T 7/73* (2017.01)

(52) U.S. Cl.
CPC ................ *G06T 7/593* (2017.01); *G06T 7/75* (2017.01); *G06T 2207/10028* (2013.01); *G06T 2207/10048* (2013.01); *G06T 2207/20081* (2013.01); *G06T 2207/20084* (2013.01)

(58) Field of Classification Search
CPC . G06T 2207/10028; G06T 2207/10048; G06T 2207/20081; G06T 2207/20084; G06V 20/64; G06V 10/60; H04N 13/239; H04N 13/254
See application file for complete search history.

(56) References Cited

U.S. PATENT DOCUMENTS

| | | | |
|---|---|---|---|
| 10,937,182 | B2 | 3/2021 | Dou et al. |
| 11,029,713 | B2 | 6/2021 | Haven et al. |
| 2004/0263510 | A1 | 12/2004 | Marschner et al. |
| 2006/0015308 | A1 | 1/2006 | Marschner et al. |
| 2011/0285822 | A1 | 11/2011 | Dai et al. |
| 2014/0085625 | A1 | 3/2014 | Ahmed et al. |
| 2015/0105892 | A1 | 4/2015 | Townsend et al. |
| 2015/0332512 | A1 | 11/2015 | Siddiqui et al. |
| 2016/0089791 | A1 | 3/2016 | Bradski et al. |
| 2016/0321523 | A1 | 11/2016 | Sen et al. |
| 2017/0116755 | A1 | 4/2017 | Imber et al. |
| 2018/0106905 | A1 | 4/2018 | Hilliges et al. |
| 2020/0134860 | A1 | 4/2020 | Haven et al. |
| 2020/0164531 | A1 | 5/2020 | Wagner et al. |
| 2020/0204777 | A1 | 6/2020 | Goldman et al. |
| 2020/0284883 | A1 | 9/2020 | Ferreira et al. |
| 2020/0286301 | A1 | 9/2020 | Loper et al. |
| 2020/0361083 | A1 | 11/2020 | Mousavian et al. |
| 2020/0394747 | A1 | 12/2020 | Chatterjee et al. |
| 2021/0150760 | A1 | 5/2021 | Haven et al. |
| 2021/0299879 | A1 | 9/2021 | Pinter et al. |
| 2022/0203547 | A1 | 6/2022 | Majumdar et al. |
| 2023/0103628 | A1 | 4/2023 | Sano et al. |
| 2023/0103638 | A1 | 4/2023 | Saharia et al. |
| 2025/0166136 | A1* | 5/2025 | Matthews ................. G06T 5/70 |

OTHER PUBLICATIONS

ISPRS Journal of Photogrammetry and Remote Sensing, Albedo estimation for real-time 3D reconstruction using RGB-D and IR data, Patrick Stotko, Michael Weinmann, Reinhard Klein, accepted Jan. 21, 2019.
Scott Satkin, Google Inc., Martial Hebert, Carnegie Mellon University, 3DNN, Viewpoint Invariant 3D Geometry Matching for Scene Understanding, This ICCV2013 paper is the Open Access Version, provided by the Computer Vision Foundation. The authoritative version of this paper is available in IEEE Xplore.
Reflectance and Albedo, Surface, J.A. Coakley, Oregon State University, Orvallis, OR, USA, Copyright 2003.
Mark F. Hansen, University of the West of England, Faculty of the Environment and Technology, 3D Face Recognition Using Photometric Stereo, May 2012.
Soma Biswas, Student Member, IEEE, Gaurav Aggarwal, Student Member, IEEE, and Rama Chellappa, Fellow, Robust Estimation of Albedo for Illumination-Invariant Matching and Shape Recovery IEEE Transactions on Pattern Analysis and Machine Intelligence, vol. 31, No. 5, May 2009.
Palette: Image-to-Image Diffusion Models by Saharia et al., SIGGRAPH 2022 Conference Proceedings, Aug. 2022.
Mail Stop PCT, Attn: ISA/US, Commissioner for Patents, P.O. Box 1450, Alexandria, VA 22313-1450, International Search Report and Written Opinion (PCT/US22/45478) dated Feb. 17, 2023.
United States Patent Office, Non-final Office Action for U.S. Appl. No. 17/491,975 dated Mar. 27, 2024.
M. J. Chantler & J. Wu, Rotation Invariant Classification of 3D Surface Textures using Photometric Stereo and Surface Spectra, Department of Computing and Electrical Engineering, Heriot-Watt University, Edinburgh, EH14 4AS, Scotland, BMVC 2000.
Extended European Search Report and Written Opinion for International Application No. PCT/US2022/045478 dated Jun. 2, 2025.
Non-final Office Action for U.S. Appl. No. 18/085,412 dated Oct. 1, 2025, 33 pages.
European Office Action for Application No. 22877420.4 dated Jun. 2, 2025, 10 pages.
Canadian Office Action for Application No. 3,230, 169 dated Oct. 15, 2025, 4 pages.
Final Office Action for U.S. Appl. No. 18/085,451 dated Oct. 24, 2025, 37 pages.
Final Office Action for U.S. Appl. No. 18/085,412 dated Oct. 1, 2025, 33 pages.
Final Office Action for U.S. Appl. No. 18/085,474 dated Oct. 23, 2025, 37 pages.
International Search Report and Written Opinion for International Application No. PCT/US2025/024657 dated Jul. 15, 2025.

* cited by examiner

SPECKLE LIMITS

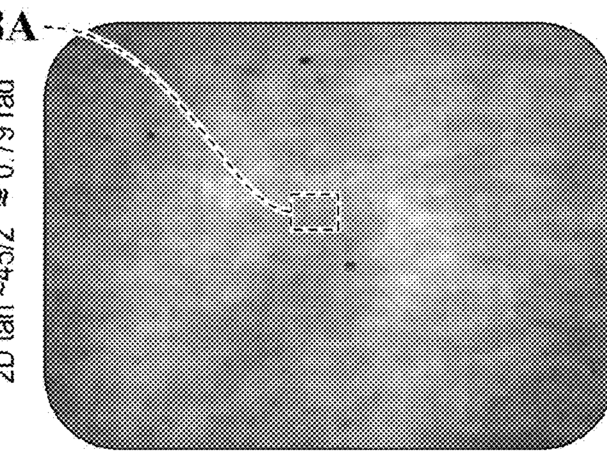

FIG. 8

1 PIXEL ≈ 0.8 mrad x 0.8 mrad ≈ 0.6 μsr
PIXEL 'A' HAS AVERAGE BRIGHTNESS $\bar{A}$
TYPICAL ENERGY FLUX PER PIXEL ≈ 0.1 μW
TOTAL ENERGY FLUX ≈ 1 sr
REGION OF FLUX ≈ 1 sr

FOR ALL PIXELS 'A' WE REQUIRE:

$$\frac{|\bar{A} - \bar{N}|}{\bar{A} + \bar{N}} \leq 3\%$$

$$\frac{|\bar{A} - \bar{S}|}{\bar{A} + \bar{S}} \leq 3\%$$

$$\frac{|\bar{A} - \bar{E}|}{\bar{A} + \bar{E}} \leq 3\%$$

$$\frac{|\bar{A} - \bar{W}|}{\bar{A} + \bar{W}} \leq 3\%$$

3 x 0.8 mrad 3 x 0.8 mrad

| | | |
|---|---|---|
| | N | |
| W | A | E |
| | S | |

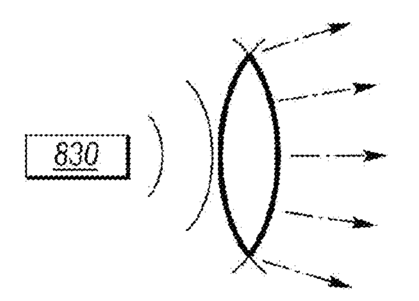

FIG. 10

METHOD AND SYSTEM FOR CREATING A HIGH-FIDELITY DEPICTION OF A SCENE CONTAINING AN OBJECT

CROSS-REFERENCE TO RELATED APPLICATIONS

This application is a continuation-in-part of U.S. application Ser. No. 17/491,975 filed Oct. 1, 2021, the disclosure of which is hereby incorporated in its entirety by reference herein.

TECHNICAL FIELD

At least one embodiment of the present invention generally relates to machine-learning-based methods and systems for creating a high-fidelity depiction of a scene containing an object and, in particular, to such methods and systems which use a trained machine-learning model such as a diffusion model to create the depiction.

OVERVIEW

The pose of an object is the position and orientation of the object in space relative to some reference position and orientation. The location of the object can be expressed in terms of X, Y, and Z. The orientation of the object can be expressed in terms of Euler angles describing its rotation about the x-axis (hereinafter RX), rotation about the y-axis (hereinafter RY), and rotation about the Z-axis (hereinafter RZ) relative to a starting orientation. There are many equivalent mathematic coordinate systems for designating the pose of an object: position coordinates might be expressed in spherical coordinates rather than in Cartesian coordinates of three mutually perpendicular axes; rotational coordinates may be express in terms of quaternions rather than Euler angles; 4×4 homogenous matrices may be used to combine position and rotation representations; etc. But generally, six variables X, Y, Z, RX, RY and RZ suffice to describe the pose of a rigid object in 3D space.

Passive Stereo (i.e. FIG. 2)

Passive stereo relies upon matching the positions of visible patches between two sensors when the relative geometry of the two sensors is known. The problem of matching such visible patches is known as the Matching Problem or the Correspondence Problem.

This method requires that the scene be captured from two, or more, cameras of known position relative to one another.

When positions are matched, triangulation is performed to determine the position of the patches and, hence, the geometry of the scene.

Active Stereo Volumetric Sensors (i.e. FIG. 3)

Active Stereo differs from Passive Stereo in that Active Stereo uses a pattern projector to project a pattern on the field of view (i.e. FOV).

This pattern helps software solve the Correspondence Problem.

Triangulation is performed as with the Passive Stereo method.

Model Matching Via Volumetric Sensors (i.e. FIG. 1)

Volumetric Sensors (aka Active Stereo sensors) use a pattern projector to project a pattern on the FOV.

This pattern helps software solve the Correspondence Problem.

Triangulation is performed to determine the geometry of a scene.

An object may be located in the scene by matching the geometry of the object to the geometry of a portion of the scene.

"Multipoint" refers to the laser projector which projects thousands of individual beams (aka pencils) onto a scene. Each beam intersects the scene at a point.

"Disparity" refers to the method used to calculate the distance from the sensor to objects in the scene. Specifically, "disparity" refers to the way a laser beam's intersection with a scene shifts when the laser beam projector's distance from the scene changes.

"Depth" refers to the fact that these sensors are able to calculate the X, Y and Z coordinates of the intersection of each laser beam from the laser beam projector with a scene.

"Passive Depth Sensors" determine the distance to objects in a scene without affecting the scene in any way; they are pure receivers.

"Active Depth Sensors" determine the distance to objects in a scene by projecting energy onto the scene and then analyzing the interactions of the projected energy with the scene. Some active sensors project a structured light pattern onto the scene and analyze how long the light pulses take to return, and so on. Active depth sensors are both emitters and receivers.

The "albedo" of an object is a measure of the amount of light reflected by an object, or radiance, relative to the amount of incident light shone on the object, or irradiance, and is indicative of the reflectance or intrinsic brightness of an object. The albedo of an object can be likened to a signature of a person, and can be used to identify the object.

U.S. Pat. No. 10,937,182 discloses a device for estimating the pose of an object based on correspondence between a data volume containing a data mesh based on a current frame captured by a depth camera and a reference volume containing a plurality of fused prior data frames.

U.S. Pat. No. 11,029,713 discloses a method and system for expanding the range of working environments in which a 3-D or depth sensor can operate without damaging or degrading the measurement performance of the sensor. The sensor has a rigid support structure and a plurality of optoelectronic components fixedly supported on the support structure. The system includes an enclosure for enclosing the support structure and the supported optoelectronic components within an interior of the enclosure. A temperature control circuit includes a controller to monitor interior temperature within the enclosure and to regulate temperature within the enclosure to be within an operational temperature range of the sensor based on the monitored temperature.

U.S. Patent Publication No. 2020/0134860 discloses a machine vision-based method and system for measuring 3D pose of a part or subassembly of parts having an unknown pose. A number of different applications of the method and system are disclosed including applications which utilize a reprogrammable industrial automation machine such as a robot. The method includes providing a reference cloud of 3D voxels which represent a reference surface of a reference part or subassembly having a known reference pose. Using at least one 2D/3D hybrid sensor, a sample cloud of 3D voxels which represent a corresponding surface of a sample part or subassembly of the same type as the reference part or subassembly is acquired. The sample part or subassembly has an actual pose different from the reference pose. The voxels of the sample and reference clouds are processed including a matching algorithm to determine the pose of the sample part or subassembly.

U.S. Patent Publication No. 2021/0150760 discloses a machine vision-based method and system to facilitate the unloading of a pile of cartons within a work cell. The method includes the step of providing at least one 3-D or depth sensor having a field of view at the work cell. Each sensor has a set of radiation sensing elements which detect scattered, projected radiation to obtain 3-D sensor data. The 3-D sensor data includes a plurality of pixels. For each possible pixel location and each possible carton orientation, the method includes generating a hypothesis that a carton with a known structure appears at that pixel location with that container orientation to obtain a plurality of hypotheses. The method further includes ranking the plurality of hypotheses. The step of ranking includes calculating a surprisal for each of the hypotheses to obtain a plurality of surprisals. The step of ranking is based on the surprisals of the hypotheses.

Active stereo algorithms (geometry-based, voxel algorithms) have highest resolution in {Z, rotX, rotY} dimensions because statistical averaging can be used over the entire surface of an object for these parameters. Active stereo algorithms have the lowest resolution in {X, Y, and rotZ} dimensions since statistical averaging in these dimensions can only occur over a linear (not surface) region. On the other hand, intensity modelling algorithms (albedo-based, pixel algorithms) have highest resolution in {X, Y, rotZ} dimensions and the lowest resolution in {Z, rotX, rotY} dimensions.

Volumetric sensors are an advancement to the machine vision state of the art in that they enable an algorithm process to solve the Correspondence Problem. Volumetric sensors describe the geometry of a scene—but cannot find objects in the scene. In addition to reporting the geometry of a scene (the voxels), current generation volumetric sensors are capable of reporting the illuminance (i.e. 'brightness' and/or 'color') characteristics of a scene (the pixels).

Algorithms exist for locating a known object by 'matching' the geometric model of that object to the observed geometry of the scene: "Iterative Closest Point" is one such algorithm.

Although the current generation of volumetric sensors can report voxels (geometry) and pixels (brightness) in a scene, algorithms in the state of the art suffer from the limitation that they are not capable of using illumination information (pixels) to refine knowledge of the location and orientation of objects.

Prior art in the fields of Simulated Depth Imaging and Pose Estimation was embodied by Microsoft's Kinect IR and Depth Imaging System. Using empirical models for the intensity, speckle, and detector noise of received IR dot patterns, Kinect and its associated systems were a leap forward. However, models associated with Kinect were still of limited accuracy. Furthermore, although they created less depth measurement noise, they lacked the ability to remove the depth measurement noise that was associated with them.

Google's published U.S. Patent Application 2023/0103638 concerns image improvement using a diffusion-based deep learning model for image denoising. It deals with the removal of a visual noise inherent in consumer smartphone images, in order to overcome the fundamental limitations of smart phone cameras. Tasks such as colorization, inpainting, uncropping, and JPG restoration are the key concerns of the Google patent application. (For a detailed write-up of the algorithm involved in the Google system, see "Pallete: Image-to-Image Diffusion Models by Saharia et al., SIGGRAPH 2022 Conference Proceedings)."

Google's model utilizes a Markov process to produce test noise to train its system. Google's target is a perfect Gaussian distribution of white noise that ranges from a completely recognizable image to a completely unrecognizable white-noise image.

Google's patent application is tailored to the consumer market and specifically mentions the "emotional benefits to those [people] who believe their images look better." The fundamental task of Google's patent application is to create plausible image detail in a scene. Thus, it is creating image detail that may or may not have been present in the original scene. 100% accuracy is irrelevant, as long as the end result is pleasing to the eye. Google's system specifically combines a black-and-white image with a color image, or alternatively, it colorizes a black-and-white image.

SUMMARY OF EXAMPLE EMBODIMENTS

An object of at least one embodiment of the present invention is to provide a diffusion vision-based method and system for creating a high-fidelity depiction of a scene containing an object by the removing depth measurement noise (i.e. sensor noise) created by minute measurement imperfections inherent in 2.5D measurements. Image data is used to create the high fidelity depiction of the scene, based on geometries primitives or geometries.

Geometric information from 3D sensors is combined with brightness information from 2D sensors in order to convert brightness information into albedo information. Since albedo is an invariant characteristic of a surface, whereas brightness is not, the albedo information can be used (along with the geometric information which is also an invariant characteristic of the surface) to refine knowledge of the poses of objects within a scene.

In carrying out the above object and other objects of at least one embodiment of the present invention, a method of creating a high-fidelity depiction of a scene is provided. The method includes uniformly illuminating a target surface of the object within the scene with light having an intensity within a narrow range of wavelengths such that the light overwhelms the intensity of ambient light within the narrow range to obtain reflected, backscattered illumination. The method also includes sensing, via a volumetric sensor, brightness of the target surface due to a diffuse component of backscattered illumination to obtain brightness information and inspecting the backscattered illumination from the target surface to obtain geometric measurements which include sensor noise. The method includes computing rotation and position invariant measured surface albedo including albedo noise based on the brightness and the geometric measurements. Then the method includes applying a machine-learning model to remove the sensor noise and the albedo noise from the geometric measurements and the measured surface albedo, respectively, to obtain a prediction of actual geometry and actual albedo, respectively, of the object.

The method may further include processing the actual albedo with a matching algorithm configured to match to a model using the actual geometry and/or the actual albedo in order to obtain a location of a model and the object within the scene.

The step of computing may include the steps of providing a location of all sources of light which illuminate the scene, providing the individual contribution of all sources of light to the sensed brightness and providing the diffuse component of backscattered illumination from all of the sources of light.

The step of inspecting may be performed by a 3D sensor which may be an active stereo sensor.

The narrow range of wavelengths may lie in the near infrared region of the light spectrum.

The light may be polarized.

The actual albedo may be normalized to distance variations and orientation variations of the object within the scene.

The method may further include filtering out a non-scattered component of the polarized light.

The surface albedo may be computed so as to be independent of object position or rotation within the scene.

Further in carrying out the above object and other objects of at least one embodiment of the present invention, a system for creating a high-fidelity depiction of a scene including an object contained within the scene is provided. The system includes a light source configured to uniformly illuminate a target surface of the object with light having an intensity within a narrow range of wavelengths such that the light overwhelms the intensity of ambient light within the narrow range to obtain reflected, backscattered illumination having a diffuse component. Also included is a volumetric sensor including at least one voxel sensor configured to sense brightness of backscattered illumination from the target surface of the object and a pixel sensor positioned in a predetermined location relative to the at least one voxel sensor, wherein the voxel and pixel sensors are configured to provide voxel and pixel information independent of ambient light. At least one processor is configured to compute measured surface albedo including albedo noise of the target surface based on the pixel information to remove correlation between rotation and pixel values for the target surface. A machine-learning model removes sensor noise caused by the volumetric sensor and the albedo noise from the measured surface albedo to obtain actual albedo of the target surface.

The at least one processor may be configured to process the actual albedo with a matching algorithm to obtain a location of the object within the scene.

The at least one processor may be configured to compute rotation and position invariant pixel information based on the voxel information.

The at least one processor may be configured to compute the actual albedo based on location of all sources of light which illuminate the scene, individual contribution of all sources of light to the sensed brightness and the diffuse component of illumination from all of the light sources.

The narrow range of wavelengths may lie in the near infrared region of the light spectrum.

The system may further include a polarization analyzer configured with a bandpass filter to reject substantially all light outside the narrow range of wavelengths and substantially all specular light.

The actual albedo may be normalized to distance and orientation variations of the object within the scene.

The system may further include a polarization filter configured to filter out a non-scattered component of the light.

The actual albedo may be computed so as to be independent of object position or rotation within the scene.

The voxel and pixel sensors may be array sensors configured to operate in the near infrared band of frequencies to generate voxel and pixel arrays, respectively.

The light source may comprise a lighting element capable of simultaneously shaping the light source to emit polarized pencils of laser light.

In summary, 3D and 2D sensors are configured to observe the same scene so that the 3D information can be used to convert the 2D (brightness) information into albedo information (i.e. albedo data matrix). The light source for doing this is an even source of illumination, strong enough to overwhelm ambient light in a narrow band, and (potentially) polarized so that only the diffuse (backscattered) component of the light is captured. This configuration, then, enables the use of novel algorithms for pose finding that use both albedo and geometry to determine the poses of objects. In other words, the method and system of at least one embodiment compute the pose of an object utilizing near infrared narrow band light in conjunction with geometric information from a 3-D sensor to calculate albedo. Actual albedo and actual 3D information are then used after removal of measurement or sensor noise as properties of a surface, invariant with respect to surface angle, position, distance, or ambient light, for the computation of the pose of the surface thereby enabling creation of a high-fidelity depiction of the scene containing the object.

BRIEF DESCRIPTION OF THE DRAWINGS

FIG. 8 is a view similar to the view of FIG. 7 but without the profiles;

FIG. 8A is an enlarged view of a portion of the patch of FIG. 8 to illustrates small scale evenness (i.e. speckle) and a specification of speckle limits;

FIG. 9 is a schematic view of one option for a dot pattern source in the form of a VCSEL array source with an infrared DOE Top Hat diffuser (i.e. low-speckle configuration); and FIG. 10 is a schematic view of a second option for a dot pattern source in the form of an LED source with beam shaping performed by molded lenses (i.e. also low-speckle).

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
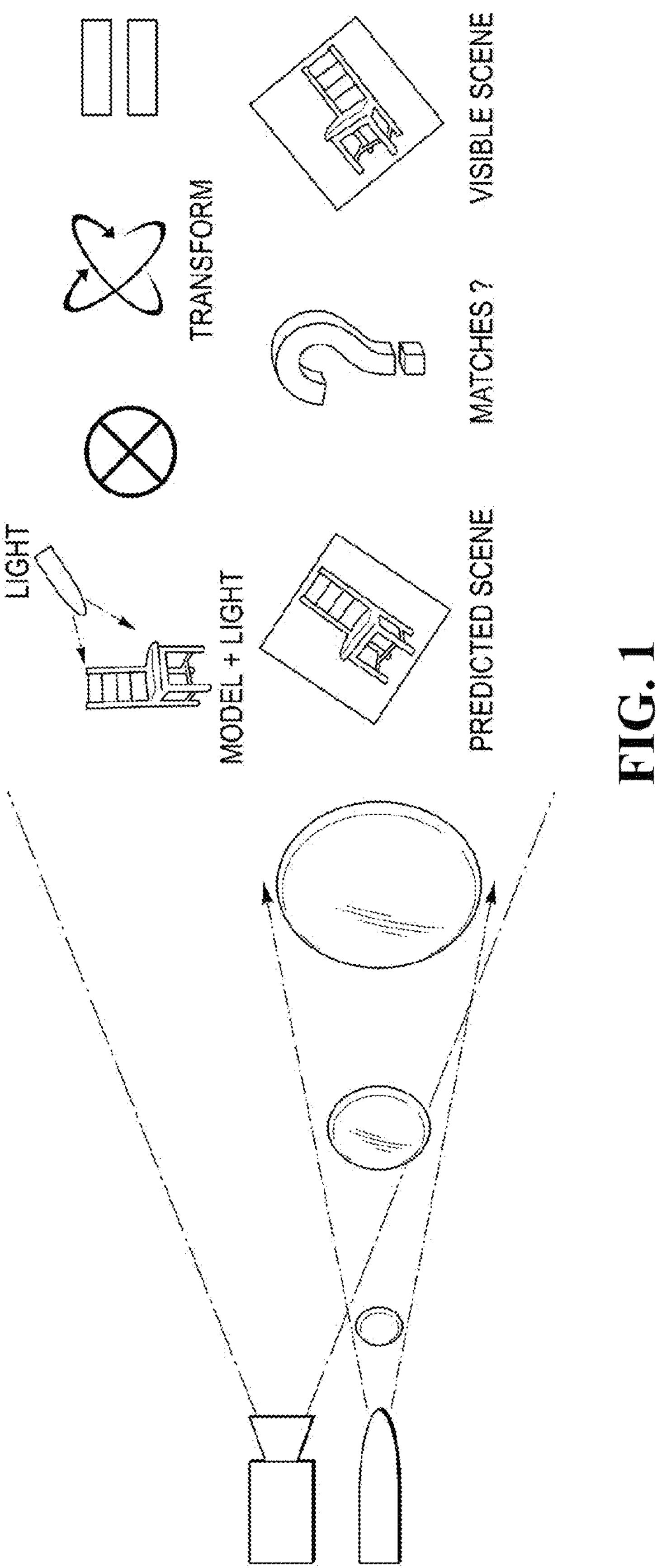
FIG. 1 is a combined schematic view illustrating model matching of a predicted scene of a chair with a visible scene of the chair utilizing an array sensor and a light source.

Referring now to FIG. 1, the purpose of a Model Matching process is to match a visible scene against a predicted scene by arriving at a correct hypothesis relating the geometry of the visible scene to the geometry of a model of the scene.

One may begin with a geometric model of the scene, an illuminance model of the scene, and knowledge of the light source and its position. The illuminance model describes how the scene reflects and scatters light based, at least in part, on the intrinsic albedo of a surface.

The geometry of the scene (voxels), and the brightness and/or color of the scene (pixels) are measured.

For each hypothesis describing a potential scene geometry, the geometric and illuminance models may be used to predict the voxels and pixels that are measured. When, for a particular hypothesis, predictions match the measurements, the hypothesis is confirmed.

A diffusion-based method and system of at least one embodiment of the present invention creates a high-fidelity depiction of a scene including an object contained within the scene utilizing both geometric and illumination information using the same sensor and a diffusion sensor model which removes depth measurement noise created by minute measurement imperfections inherent in 2-5D measurements. The phrases “measurement noise” and “sensor noise” are used interchangeably herein. They are used in a general sense and include substantially all sources of measurement noise and error. That includes circuitry noise, algorithm noise and any other source of uncertainty.

Ambient-immune, rotation- and position-invariant voxel and pixel information is obtained from the same object with at least one embodiment of the present invention by combining the strengths of these two methods for industrial applications such as manipulation of items or objects by one or more robots.

The method and system of at least one embodiment of the present invention overcomes the following problems or difficulties:

1) Minute measurement imperfections inherent in 2.5D measurements create image perception and measurement noise concerns;
2) The quantities reported by the sensors for illuminance (the pixels) are not rotation-invariant—that is, under different rotational presentations, portions of the objects being observed will report different pixel values, the geometric relations of a surface (the voxels) do not suffer from this problem; and
3) Likewise, the pixels reported by the sensors are not position-invariant—any given portion of an object will report different illuminance or color values at different positions as the object is slid to-and-fro or side-to-side.

It is possible to solve these problems, and thus enable object matching using both pixels and voxels, via a combination of hardware and software innovations over the current state of the art as follows:

One innovation may be characterized as a software innovation in the form of a diffusion sensor model such as a trained neural network which removes sensor noise caused by the sensor.

Another innovation may be characterized as a hardware innovation coupled with a software innovation. The reason that illuminance relations are not rotation invariant is that ‘illuminance’ is the improper quantity to use for matching. More usefully, the ‘albedo’ of an object is rotationally invariant. Albedo may be measured at a point, for non-specular objects under diffuse illumination, per the well known Phong lighting or reflection model, as:

$$\alpha = I_i \sec \alpha_i \quad \text{[Equation 01]}$$

Where $I_i$ is the observed brightness of the surface due to the diffuse component of light returned from illumination source I, and $\alpha_i$ is the angle between the surface normal of the surface and the direction of a light source i. Assuming one knows the location and intensity of all light sources illuminating a scene, α is calculatable using the information contained in the (rotationally invariant) voxels alone. Thus, a volumetric sensor (i.e. for example, the sensor 10 of FIG. 4) contains or generates the information or data needed to compute rotationally-invariant pixel information.

One innovation of at least one embodiment of the present invention is to simultaneously insure the conditions necessary for Equation 1:

1. The location of all sources is known.
2. The individual contribution of all sources to the observed brightness of the object is known.
3. The diffuse component of illumination from all sources is known.

One condition is insured by illuminating the scene with light sources of a narrow wavelength such that the intensity of the light at the given wavelength completely overwhelms the intensity of the ambient light at that wavelength. A narrow band pass filter is deployed to block light from all wavelengths outside the narrow range. A good choice is 940 nm illumination, which lies in the near infrared region.

Another condition is insured by locating a small number of uniform point source flood illuminators at known positions with respect to the sensors gathering the image pixels. In one implementation, the small number of illuminators is set to one, and the location is on the face of the sensor, near the pixel camera.

The last condition is insured by inspecting the visible scene using polarized light where a polarization analyzer is configured with the band pass filter to reject A) all light outside the narrow band and B) all specular light. Since the active stereo cameras (the voxel sensors) are configured to inspect backscattered illumination from the target surface, the illumination sensors (the pixel sensors) are placed in the same general geometric arrangement as the voxel sensors.

In this manner, the sensors are configured to provide consistent and reliable voxel information independent of ambient light as well as consistent and reliable pixel information independent of ambient light. The consistent, ambient-immune pixel information enables the computation of surface albedo for matching algorithms.

Another innovation of at least one embodiment of the present invention may be characterized as a series of software innovations coupled with a single hardware innovation. The first innovation removes the correlation between rotation and observed pixel values for a patch on the surface of an object. Briefly, although the observed brightness of a surface patch will vary as the surface patch is rotated, this variation occurs in a predictable fashion, depending only on the geometry of the scene and the consistency of the light source. When, instead of the observed brightness of the surface, the computed albedo of the surface is considered, the albedo is seen to be rotation invariant.

Position correlations between brightness measurements and part presentations have two causes:

First, position correlations occur because typical light sources are non-uniform over their projected field of view. That is, the light energy emitted by the light source varies as a function of angle from the central ray of the light (i.e. the light "falls off" towards the edge of the light) or is non-uniform in other ways. The light source of at least one embodiment of the present invention is designed using special lenses and/or diffractive optics so that it is uniform over the field-of-view. In this way, one removes position correlations due to movements in a plane perpendicular to the sensor's line of sight.

Second, position correlations occur due to the fact that a scene gets darker as it recedes. This is a correlation due to movements parallel to the sensor's line of sight. Again, however, these variations are computable from the geometry of the scene.

Observed brightness may be normalized for distance variations by observing that the area of a pixel's intersection with a surface increases in proportion to distance squared. That is, the area over which the energy of backscattered light from a surface is gathered increases at the same rate that the flux density decreases with distance. However, the apparent brightness of a light source falls of as 1/distance^2. Thus, the observed brightness for distance variations is normalized by multiplying by distance squared. The normalized equation for albedo is therefore Equation 2 below:

$$\alpha = z^2 - d^2 1 \sec \alpha \quad \text{[Equation 02]}$$

By creating a nominal point source, located coincident with the location of a volumetric (3D voxel) sensor and a brightness sensor, over its entire field, that is insensitive to ambient lighting conditions, and that filters out the non-scattered component of the analyzed light, the computed albedo (according to equation 2 above) is not a function of position or rotation. The computed albedo does not vary according to the rotation of the object, or according to the position of the object within the sensor's field of view, nor does it vary with changes in ambient lighting conditions.

This enables the combination of intensity modelling and geometry modelling algorithms.

Thus, the light sources of at least one embodiment of the present invention typically are:

A. Narrow band;

B. Intense enough to overwhelm ambient illumination at the chosen wavelength;

C. Polarized; and

D. Uniform over the projected field.

These light sources are typically coupled with pixel sensors with:

A. Band pass filters centered at the chosen wavelength; and

B. Polarization analyzers configured to reject non-diffuse illumination.

The entire sensor contains:

A. Active stereo sensors capable of measuring scene geometry (voxels)

B. Aforementioned pixel sensors and light sources.

In summary, at least one embodiment of the present invention enables algorithms capable of measuring poses of objects in scenes to good accuracy in (Z, rotX, rotY) using Voxels and moderate accuracy {X, Y, rotZ} using Voxels. Refinement of the moderate accuracy measurements can be obtained by using Pixel algorithms to refine {X, Y, rotZ}. Even better accuracy is obtained by the use of a trained generative model such as a diffusion sensor model to remove sensor noise thereby creating a high-fidelity depiction of the scene.

By insuring that the light source is even across its field-of-projection, at least one embodiment of the present invention insures that there is no correlation between horizontal placement of an object within a field-of-view and the surface's computed albedo. By employing geometric information obtained from the 3D sensor to normalize diffuse (backscattered) brightness for distance and surface orientation, at least one embodiment of the present invention insures that there is no correlation between distance or orientation of an object and its computed albedo. By utilizing polarized light and a polarization analyzer the at least one embodiment insures that only the diffuse component of the light scattered from the observed surface is measured, thus removing correlation between the glossiness of the surface and its computed albedo. By projecting enough illumination in a narrow band to overwhelm ambient light in that band, along with a band-pass filter configured to reject light outside the narrow band, the at least one embodiment insures that computed surface albedo is not correlated with accidental features such as time of day (sunlight) or ambient illumination.

In one example embodiment, the light sources have the following specification:

Operating Wavelength: Near Infrared

Illuminated Field: greater than 60 deg×45 deg

Luminance: 50-100 micro Watt per $deg^2$ (~330 mW/steradian)

Speckle: <3% variation per 0.6E-06 steradian (10 msec integration)

Edge-to-Edge Evenness: <25% variation over diagonal cross-section

Operation: Strobed 1 to 60 mSec per 120 mSec, typical; <10 uSec rise/fall time

Figures 2, 3, 4:
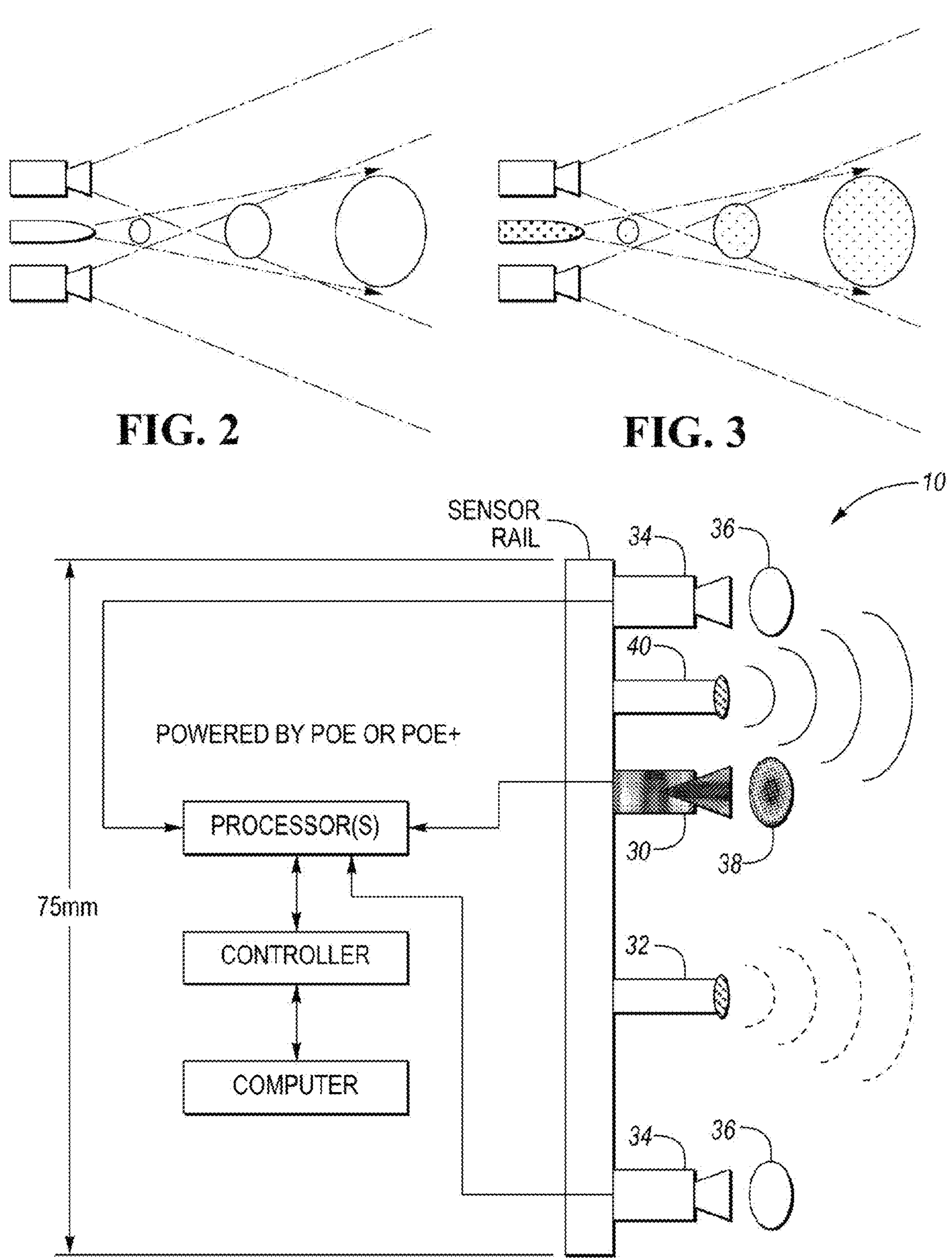
FIG. 2 is a schematic view illustrating a pair of spaced sensors or cameras and a light source disposed between the cameras.
FIG. 3 is a schematic view illustrating a pair of spaced sensors or cameras and a pattern projector disposed between the cameras and which projects a pattern on a field of view (i.e. FOV)
FIG. 4 is a schematic view of a sensor rail, a plurality of optoelectronic components supported thereon, one or more processors, a controller and a computer, all constructed in accordance with at least one embodiment of the present invention.

Referring now to FIG. 4, the preferably, one or more 3-D or depth sensors 10 of at least one embodiment of the invention measure distance via massively parallel triangulation using a projected pattern (a "multi-point disparity" method). The specific types of active depth sensors which are preferred are called multipoint disparity depth or volumetric sensors.

The sensor 10 preferably includes a dot pattern source in the form of a pattern projector or emitter 32 operating at some infrared wavelength, one or more array sensors in the form of cameras or detectors 34 configured to receive light at the wavelength and generate voxel arrays. The pattern is projected by the emitter 32 onto the surface of the object and is read by one or more detectors 34 along with the information from the sensor 30 which together with an NIR filter and an NIR polarization filter 38 generates pixel arrays. The laser projector 32 operates by means of diffractive optical elements to project several tens of thousands of laser pencils or beams onto a scene to be analyzed. The detector 34 analyzes the scene at wavelength 'L' to locate the intersections of the laser pencils with the scene and then uses geometry to calculate the distance to objects in the scene. The visible light camera 30 in a preferred embodiment is used to associate a color or monochrome intensity to each portion of the analyzed image.

The pattern emitter 32 may be comprised of an infrared laser diode emitting at 830 nm and a series of diffractive optics elements (DOE) 38. These components work together to create a laser "dot" pattern. The laser beam from the laser diode is shaped in order to give it an even circular profile then passed through two diffractive optics elements. The first element creates a dot pattern containing dots, the second element multiplies this dot pattern into a grid. When the infrared pattern is projected on a surface, the infrared light scattered from the surface is viewed by one or more detectors 34 configured to be sensitive in the neighborhood of 830 nm. In addition to the dot pattern source 32, the sensor 10 includes a uniform source 40 in the form of a DOE pattern generator.

In addition to the IR sensor 34, there may be an RGB sensor or camera 30 configured to be sensitive in the visible range, with a visible light, band-pass filter operative to reject light in the neighborhood of 830 nm. During operation, the IR sensor 34 is used to calculate the depth of an object and the RGB sensor 30 is used to sense the object's color and brightness. This provides the ability to interpret an image in what is traditionally referred to as two and a half dimensions. It is not true 3D due to the sensor 10 only being able to detect surfaces that are physically visible to it (i.e., it is unable to see through objects or to see surfaces on the far side of an object).

The light source may comprise a lighting element capable of simultaneously shaping the light source to emit polarized pencils of laser light—thus combining the polarizer and the pattern generator into a single element.

Multiple volumetric sensors may be placed in key locations around and above the object to be located. Each of these sensors typically captures hundreds of thousands of individual points in space. Each of these points has both a Cartesian position in space and an associated RGB color value. Before measurement, each of these sensors is registered into a common coordinate system. This gives the present system the ability to correlate a location on the image of a sensor with a real-world position. When an image is captured from each sensor, the pixel information, along with the depth information, is converted by a computer (FIG. 4) into a collection of points in space, called a "point cloud."

In one example, each DOE 36 comprises an NIR bandpass filter (830±nm); each array sensor 34 operates at 830 nm (60×45 fov; 1280×960), the uniform source 40 comprises a 830 nm Fabry-Perot laser diode operating as a DOE pattern generator; the array sensor 30 operates at 940 nm with a 60×45 fov and 1280×960 array, the filter 38 accepts 930-950 nm and serves as an NIR bandpass filter and NIR polarization filter; and the dot pattern source 32 is a 830 nm Fabry-Perot laser diode (same as the source 40).

Referring again to FIG. 4, the computer controls a controller which, in turn, controls at least one vision processor, the array sensor 30, the emitter (i.e. source) 32, the uniform source 40 and the detectors 34 (i.e. array sensors) of the sensor 10.

At least one embodiment of the present invention uses the sensor 10 to measure color, brightness and depth at each of hundreds of thousands of pixels. The collective 3D "point cloud" data may be presented on a screen of a display (not shown) as a 3D graphic.

A point cloud is a collection of data representing a scene as viewed through a "vision" sensor. In three dimensions, each datum in this collection might, for example, consist of the datum's X, Y and Z coordinates along with the Red, Green and Blue values for the color viewed by the sensor 10 at those coordinates. In this case, each datum in the collection would be described by six numbers. To take another example: in two dimensions, each datum in the collection might consist of the datum's X and Y coordinates along with the monotone intensity measured by the sensor 10 at those coordinates. In this case, each datum in the collection would be described by three numbers.

Machine vision system lighting must contend with ambient factory lighting. For machine vision systems that inspect larger subassemblies measuring half a meter or more along the longest axis, it becomes progressively more difficult to provide lighting that provides consistent illumination despite changes in ambient factory lighting. Consistent illumination for larger parts typically requires large machine vision lights and shrouds that block direct interference by the brightest factory lights. Accommodating this need for lighting requires engineering resources and also occupies valuable factory floor space.

If the sensor provides its own illumination, and if this illumination uses wavelengths outside the spectrum of visible light and if the illumination is concentrated into an artificial pattern not present in natural lighting, then the sensor can operate in the presence or absence of ambient visible light. In factories ambient lighting conditions can vary widely from very bright to very dark, and the robustness of a machine vision system is improved if it is not affected by ambient lighting changes.

Figure 5:
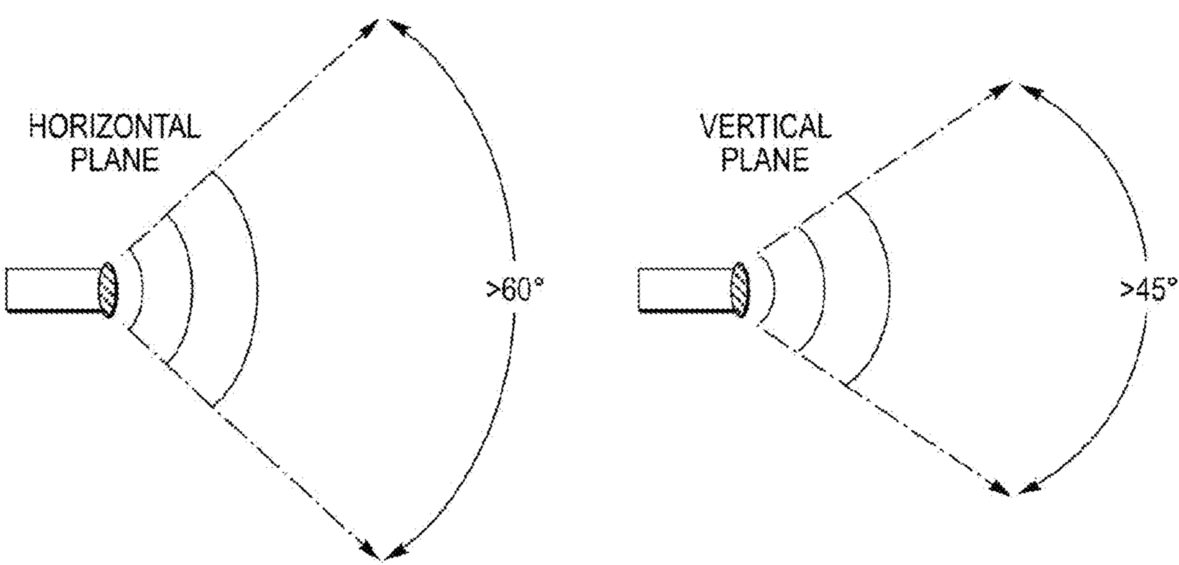
FIG. 5 is a schematic view of a dot pattern source and its illumination field of view in horizontal and vertical planes.

FIG. 5 is illustrative of the illumination FOV of at least one embodiment of the present invention in both vertical and horizontal planes.

Figure 6:
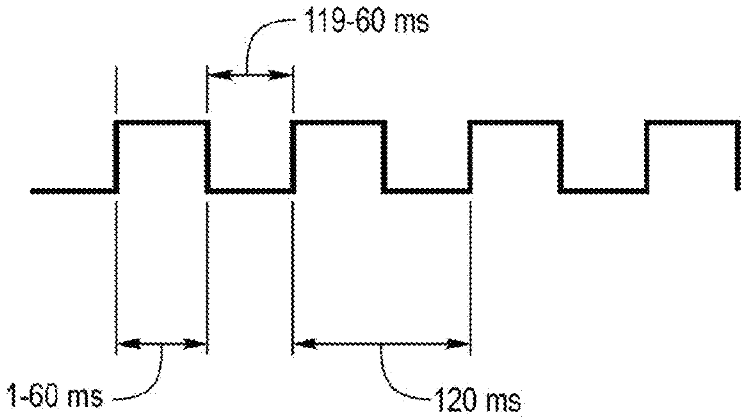
FIG. 6 is a strobing waveform for a light source of at least one embodiment of the present invention.

FIG. 6 is illustrative of a strobing waveform of at least one embodiment.

Figure 7:
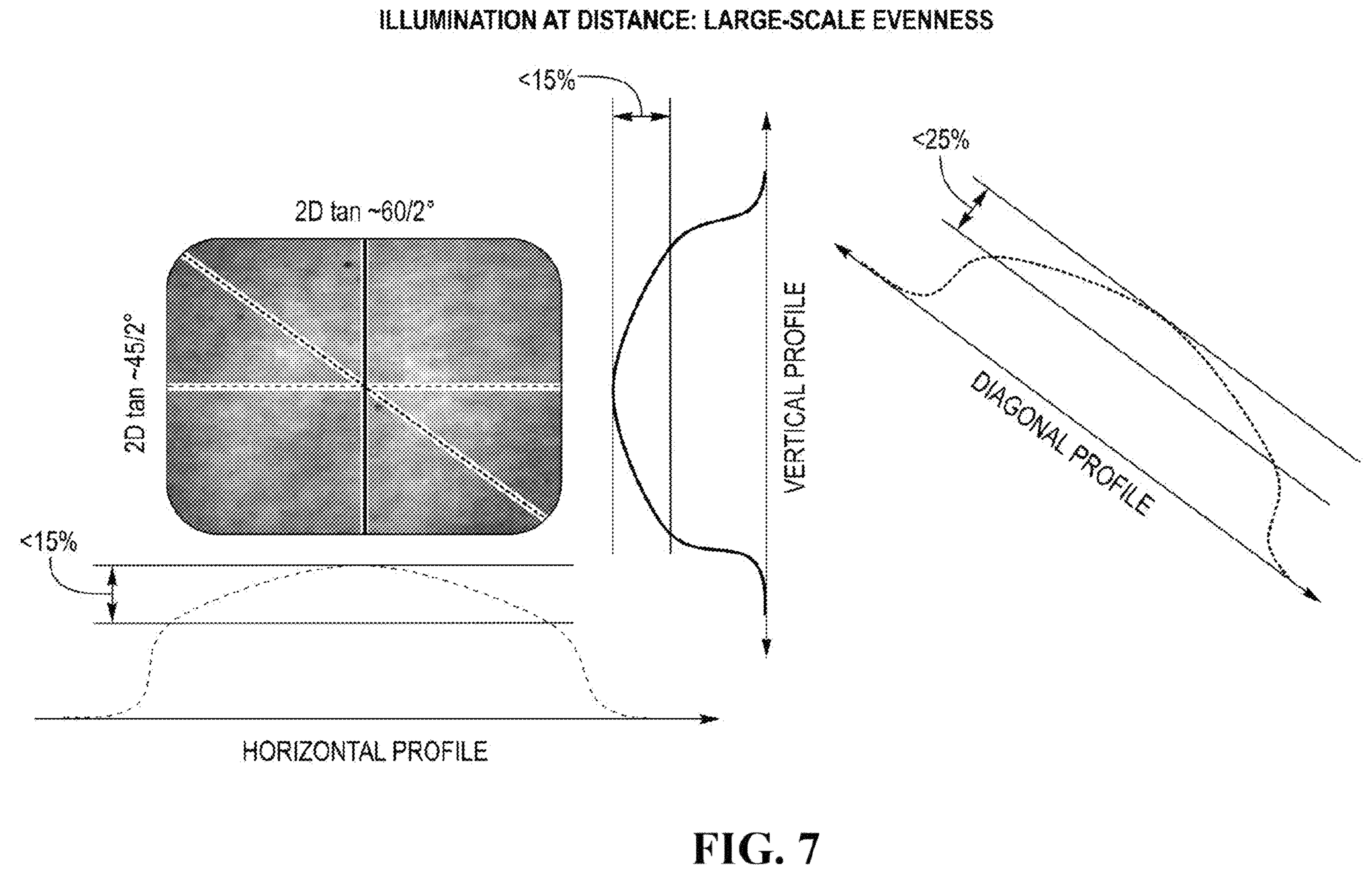
FIG. 7 is a combined view of a patch of an illuminated object with horizontal, vertical and diagonal profiles which extend across the patch; large-scale evenness of the illumination is illustrated.

FIG. 7 is illustrative of illumination at a distance D; large scale evenness in horizontal, vertical and diagonal directions is illustrated in various profiles.

FIG. 8 is illustrative of illumination of a surface patch at distance, D.

FIG. 8A is an enlarged view of a portion of the patch of FIG. 8 contained within dashed lines of a box and illustrating small scale evenness (speckle) for pixels "A".

FIG. 9 is illustrative of one type of illumination source (i.e. a VCSEL array source with an integrated DOE Top Hat diffuser).

FIG. 10 is illustrative of another type of illumination source (i.e. an LED source integrated with beam shaping optics or molded lenses.

The following describes the diffusion sensor model (i.e. Grand Sensor Model) used in at least one embodiment of the present invention to remove sensor noise caused by the volumetric sensor and albedo noise from the measured surface albedo. The diffusion sensor model is typically a trained network using a geometry model section and an albedo model section.

The Grand Sensor Model for Diffusion Based Denoising

Summary

The Grand Sensor Model combines 4 measurements:

1. Forward Geometry Measurements
2. Reverse Geometry Measurements
3. Forward Albedo Measurements (in conjunction with Forward Geometry Measurements)
4. Reverse Albedo Measurements (in conjunction with Reverse Geometry Measurements)

The Geometry Model, Forward and Reverse

Geometry is measured by a volumetric sensor and stored as a 3D point cloud.

Appearance is measured by a positionally and rotationally invariant lighting system.

Measured Geometry minus Actual Geometry equals noise, aka Calculated Error.

The Sensor Modulation Transfer Function (SMTF) is a probability distribution calculation function. This is to say it takes as an input the geometry of the object in question, along with the relevant properties of the sensor, and the output of the function is the probability distribution of the noise. The SMTF starts with the actual object in question as a reference point and creates measurements. Thus, data is flowing from the actual object to a set of measurements. It is also known as the Forward Sensor Geometry Model.

Two forms of measurement are used to create the SMTF. First, geometric measurements are stored as a 3D point cloud and expressed in ABCXYZ Cartesian coordinates. Second, albedo is measured using a rotationally and positionally invariant lighting system as described herein. Initial measurements are expressed in gray-levels (or RGB levels) and then converted to a direct albedo measurement expressed as fraction of the light diffused versus the light incident on the object in question.

This may be expressed conceptually as:

Actual Geometry+Sensor Noise=Measured Geometry

The Diffusion Denoising Model removes the measurement noise from the above measurements and predicts more accurately the true geometry of the object. It is also known as the Reverse Sensor Geometry Model, since it starts with the measurements and works back to the actual geometry.

This may be expressed conceptually as:

Measured Geometry−Sensor Noise=Actual Geometry

The Albedo Model, Forward and Reverse

Forward Sensor Albedo and Appearance Model and the Diffusion Denoising Model for Albedo and Appearance.

This section of the Grand Sensor Model describes a system and method to remove noise from the albedo image of an object.

Appearance is defined here as the extrinsic, measured brightness of a reference patch. As such, it varies directly with the amount of light available.

The albedo is the intrinsic ratio of reflected light to absorbed light, also known as the intrinsic brightness, of the same reference patch. Albedo may also be described as a back-calculated property of a surface that measures the diffuse reflectance of that surface.

While the appearance is the light reflected off the object, the albedo is the "light fingerprint" so to speak, of an object that remains the same, even in the complete absence of light.

If albedo and geometry are known, appearance may also be computed, to a first approximation, using, for instance, the Phong lighting model, provided the light source is stable and predictable. Similarly, if appearance and geometry are known, albedo may also be computed. The current state of the art relies on appearance measurement models. In contrast to these, the albedo model, when used in conjunction with a 3D volumetric sensor, allows one to work in an albedo which is advantageous for the reasons explained herein.

The Forward Sensor Albedo Model takes as input the actual geometry, as well as the actual albedo of the object in question, and it gives as output a prediction of the measured albedo plus albedo sensor noise. This may be expressed conceptually as:

$\text{Albedo}_A + \text{Noise} = \text{Albedo}_M$ where the measured albedo, $\text{Albedo}_M$, is written as the sum of an actual albedo, $\text{Albedo}_A$, and a noise term.

Data flows from the actual object to a set of measurements. Hence the moniker "Forward." The Reverse Sensor Denoising Model takes as input the measured geometry and the measured albedo and removes the noise from the measured albedo to get the actual albedo. This can be expressed conceptually as:

$\text{Albedo}_M - \text{Noise} = \text{Albedo}_A$

Since it starts with the albedo measurements and works back to the actual albedo, it has the moniker "Reverse". Additionally, the actual albedo may be calculated by appropriately combining the measured appearance and the measured geometry. This is because if the measured appearance and the measured geometry are known, one may similarly compute the measured albedo in a straightforward fashion.

Method for Obtaining the Sensor Model

In a preferred embodiment, measurements are obtained for The Sensor Model by means of placing an object at the center-point of a spherical coordinate system. The sensor on the end-of-arm-tool moves along the surface of the sphere and always remains directed towards the center-point. An instruction is given to visit a number of points (e.g., 10,000) on this spherical shell, take an image at each point, and store that image along with the coordinates that the image was taken from. From this information, given a known target, the theoretical noise-free image that the sensor should see may be calculated.

When lighting is appropriately controlled, the albedo of the object in question may also be back-calculated simultaneously.

Embodiments of the invention can take the form of an entirely hardware embodiment, an entirely software embodiment or an embodiment containing both hardware and software elements. In a preferred embodiment, the invention including control logic is implemented in software, which includes, but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The diffusion sensor model utilizes a Markov process to produce test noise to train its system. In particular, a finite noise curve of non-arbitrary, spatially correlated noise that is limited by sensor error is the present target.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

While a trained diffusion model has been described herein as a preferred machine-learning model, GANs and VAEs may be used in whole or in part. For example, GANs are most used modeling the noise creation process, (i.e., adding testing noise), in the forward sensor model. VAEs may be of use in the reverse process. VAEs and/or GANs may be used as an alternative for the noise production process.

What is claimed is:

1. A method of creating a high-fidelity depiction of a scene, the method comprising:

uniformly illuminating a target surface of an object with light having an intensity within a narrow range of wavelengths such that the light overwhelms an intensity of ambient light within the narrow range to obtain reflected, backscattered illumination;

sensing by a volumetric sensor, brightness of the target surface due to a diffuse component of the backscattered illumination to obtain brightness information; inspecting the backscattered illumination from the target surface to obtain geometric measurements which include sensor noise;

computing rotation and position invariant measured surface albedo including albedo noise of the object based on the brightness information and the geometric measurements; and applying a machine-learning model to remove the sensor noise and the albedo noise from the geometric measurements and the rotation and position invariant measured surface albedo, respectively, to obtain a prediction of actual geometry and actual albedo, respectively, of the object.

2. The method as claimed in claim 1, wherein the inspecting is performed by a 3D sensor such as an active stereo sensor.

3. The method as claimed in claim 1, further comprising processing the actual albedo with a matching algorithm configured to match to a model using the actual geometry and the actual albedo in order to obtain a location of a model and the object within the scene.

4. The method as claimed in claim 1, wherein the computing includes steps of providing a location of all sources of light which illuminate the scene, providing individual contribution of all sources of light to the sensed brightness and providing the diffuse component of backscattered illumination from all of the sources of light.

5. The method as claimed in claim 1, wherein the narrow range of wavelengths lies in the near infrared region of the light spectrum.

6. The method as claimed in claim 1, wherein the light is polarized.

7. The method as claimed in claim 1, wherein the machine-learning model includes a geometry model section and an albedo model section.

8. The method as claimed in claim 1, wherein the machine-learning model comprises a trained neural network.

9. The method as claimed in claim 1, wherein the actual albedo is normalized to distance variations and orientation variations of the object within the scene.

10. The method as claimed in claim 1, further comprising filtering out a non-scattered component of the light.

11. The method as claimed in claim 1, wherein the actual albedo is computed so as to be independent of object position or rotation within the scene.

* * * * *